(12) United States Patent
Huang

(10) Patent No.: US 7,422,395 B2
(45) Date of Patent: Sep. 9, 2008

(54) TOOL HOLDER STRUCTURE

(76) Inventor: Hsien-Jen Huang, 6F, No. 15, Lane 51, Sec. 2, Shangsing St., Dali City, Taichung County (TW)

( * ) Notice: Subject to any disclaimer, the term of this patent is extended or adjusted under 35 U.S.C. 154(b) by 0 days.

(21) Appl. No.: 11/599,302

(22) Filed: Nov. 15, 2006

(65) Prior Publication Data

US 2008/0112767 A1     May 15, 2008

(51) Int. Cl.
*B23B 29/12*     (2006.01)
(52) U.S. Cl. ............................ 407/107; 407/101; 407/99
(58) Field of Classification Search .................. 407/85, 407/99, 107, 101–104, 109; *B23B 29/12, B23B 27/16*
See application file for complete search history.

(56) References Cited

U.S. PATENT DOCUMENTS

| 2,897,580 | A | * | 8/1959 | Huber | 407/4 |
| 3,268,977 | A | * | 8/1966 | Diemond | 407/5 |
| 3,303,553 | A | * | 2/1967 | Severson | 407/6 |
| 3,568,283 | A | * | 3/1971 | Wyss | 407/107 |
| 4,876,932 | A | * | 10/1989 | Nessel | 82/158 |
| 5,586,844 | A | * | 12/1996 | Nyman | 407/105 |
| 5,669,742 | A | * | 9/1997 | Sjoo et al. | 407/105 |
| 6,270,294 | B1 | * | 8/2001 | Sjoo et al. | 407/101 |
| 2005/0232711 | A1 | * | 10/2005 | Shaheen | 407/107 |

* cited by examiner

*Primary Examiner*—Boyer D. Ashley
*Assistant Examiner*—Sara Addisu
(74) *Attorney, Agent, or Firm*—Rosenberg, Klein & Lee

(57) ABSTRACT

A tool holder includes a main part, and an angular pressing member; the main part has a fitting portion at one end, and holding portion adjacent to a front edge of and lower than the fitting portion; the angular pressing member has a recessed holding portion, which has a receiving hole, and a protruding portion therein; a pad is screwed onto the holding portion, and a tool is fixed on the pad to be closely in touch with the front edge of the fitting portion; the angular pressing member is screwed onto the fitting portion such that the recessed holding portion fits over a rear portion of the tool, and the protruding portion is pressed against an upper side of the tool, and an edge of the tool closely touches an edge of the recessed holding portion, and a rear tip of the tool is received in the receiving hole.

4 Claims, 6 Drawing Sheets

TOOL HOLDER STRUCTURE

BACKGROUND OF THE INVENTION

1. Field of the invention

The present invention relates to a tool holder, more particularly one, which will prevent the tool from getting damaged and broken in vibration during a machining process, and allows the tool to be used repeadedly.

2. Brief Description of the Prior Art

Advanced lathes are available for performing precision machining operation with progress of technology. Tools are usually held on tool holders of lathes in such a way as to be easily changed.

A conventional tool holder includes a tool holder main part, and an angular pressing member. The tool holder main part has a fitting portion at a rear end, and a tool holding portion adjacent to the fitting portion; the fitting portion has a screw hole on a bottom, and a propping portion protruding on a rear end; the tool holding portion has a connecting hole on a bottom thereof. A plate-shaped tool is positioned on a pad, and screwed onto the tool holding portion by means of a bolt, which is passed through the connecting hole. The angular pressing member is positioned on a C-shaped ring, and screwed onto the fitting portion of the main part by means of a fixing screw, which is passed though the angular member and into the screw hole; thus, the angular pressing member is pressed against a rear portion of the plate-shaped tool, and closely in touch with the propping portion of the fitting portion of the main part at rear a rear edge thereof. Therefore, the propping portion of the main part will prop the angular pressing member, which will be subjected to rearward force in a machining operation.

However, the above tool holder has the following disadvantages:

1. The plate-shaped tool is prone to get damaged and even broken in vibration during a machining operation because the angular pressing member is only pressed against a small portion of a rear end of the plate-shaped tool.

2. The plate-shaped tool will hit a corner of the tool holding portion of the tool holder main part during a machining operation. Consequently, the plate-shaped tool wears very rapidly, and the service life is reduced, causing increase to the manufacturing cost.

SUMMARY OF THE INVENTION

It is a main object of the invention to provide an improvement on a tool holder, which will prevent the tool from getting damaged and broken in vibration during a machining process, and allows the tool to be used repeadedly, thus overcoming the above-mentioned problems.

The tool holder of the present invention includes a main part, and an angular pressing member. The main part has a fitting portion at one end, and a holding portion adjacent to a front edge of and lower than the fitting portion. The angular pressing member has a recessed holding portion, with a clearance hole in an upper wall thereof. The angular pressing member has a protruding portion formed in the upper wall of the of the recessed holding portion and extending between a front end thereof and the clearance hole. A pad is screwed onto the holding portion of the main part. A tool is fixed on the pad to be close to the front edge of the fitting portion. The angular pressing member is screwed onto the fitting portion such that the recessed holding portion fits over a rear portion of the tool, and the protruding portion is pressed against an upper side of the tool, and an edge of the tool is in close proximity to a side edge of the recessed holding portion, and a rear one of the tips of the tool is disposed under the clearance hole. Thus, the rear tip of the tool cannot hit the upper wall of the recessed holding portion of the angular pressing member and thereby be damaged or broken when vibration occurs during machining, because the receiving hole is located above the rear tip of the tool.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
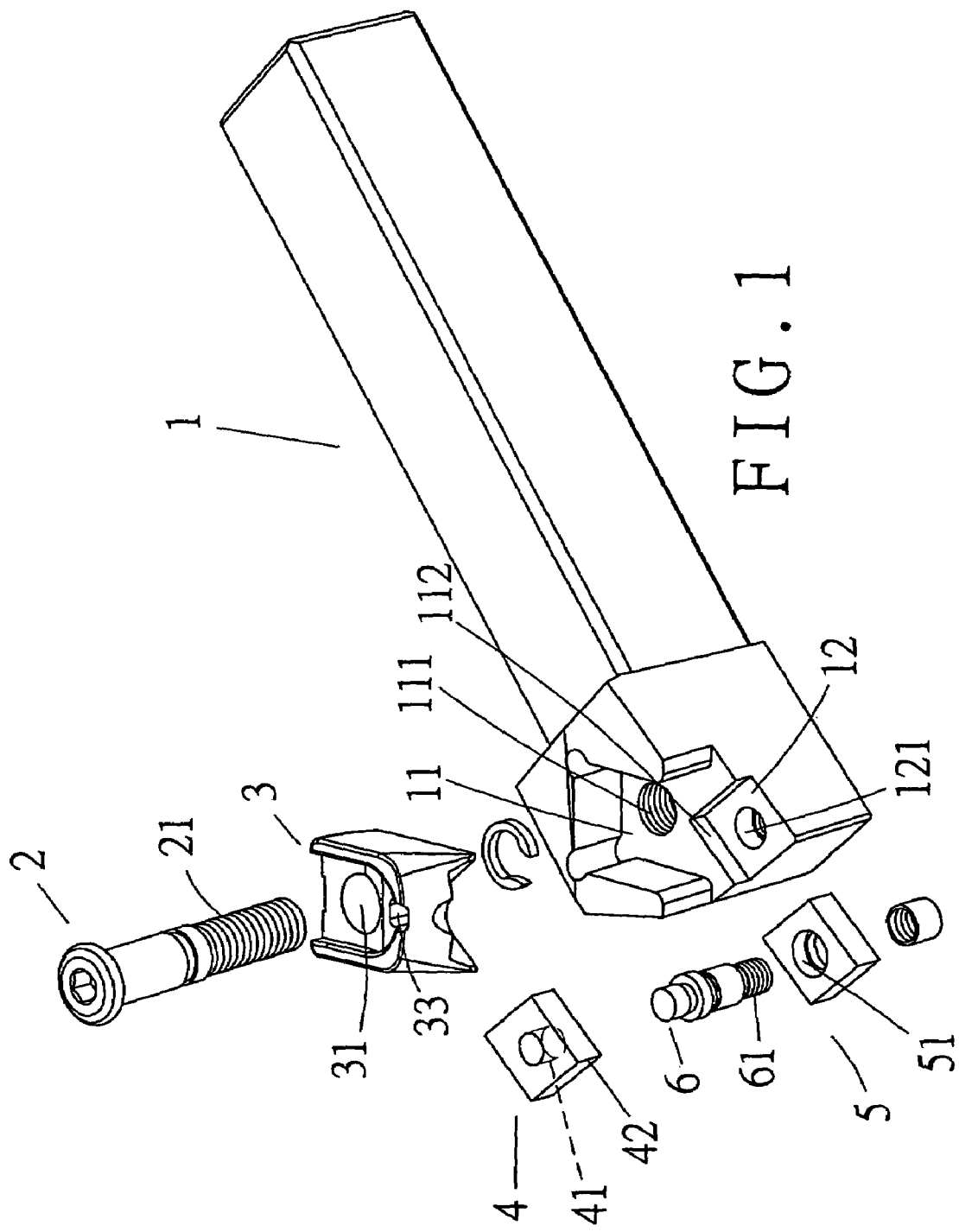
FIG. 1 is an exploded perspective view of the present invention.
Figure 2:
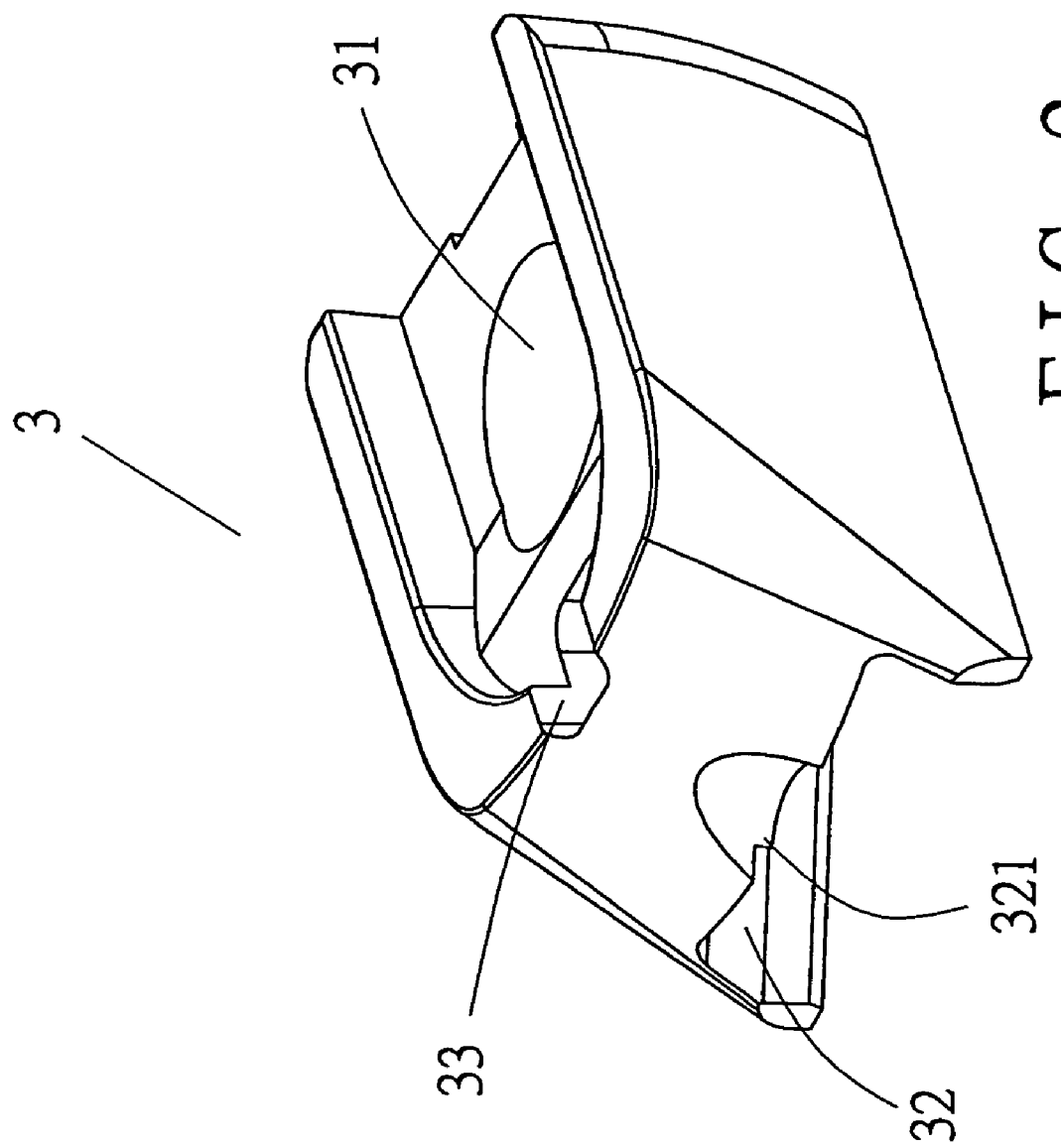
FIG. 2 is a perspective view of the angular pressing member of the present invention.
Figure 3:
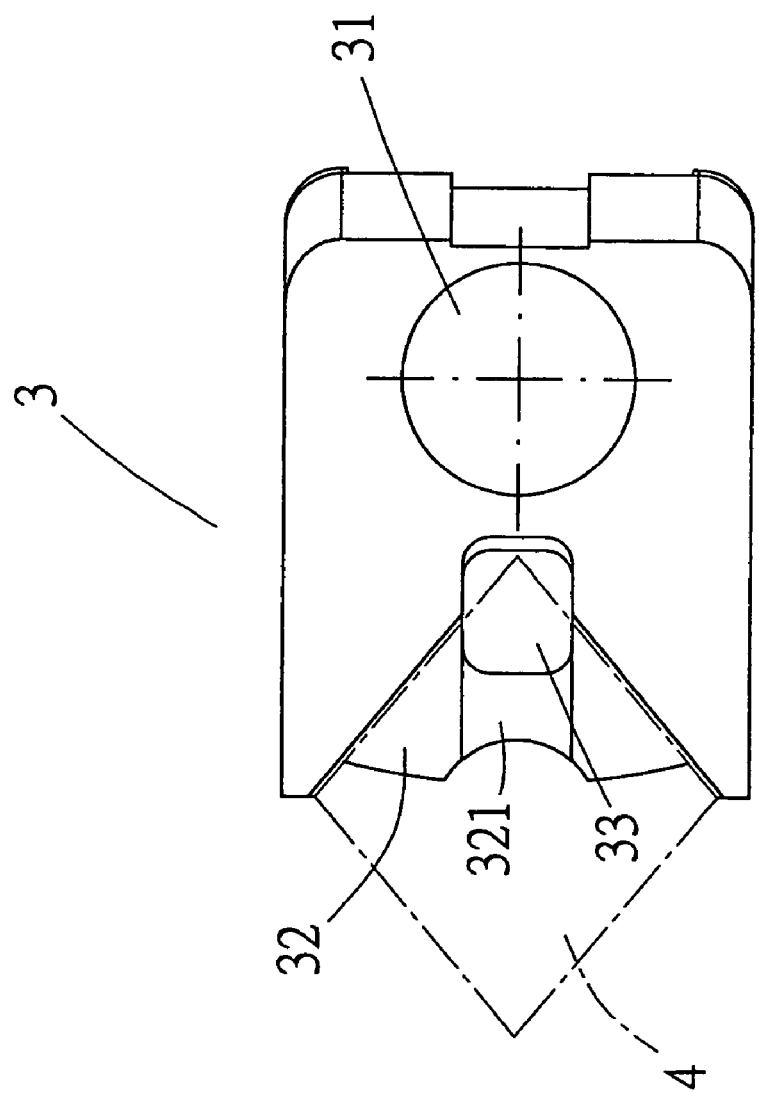
FIG. 3 is a top view of the angular pressing member.
Figure 4:
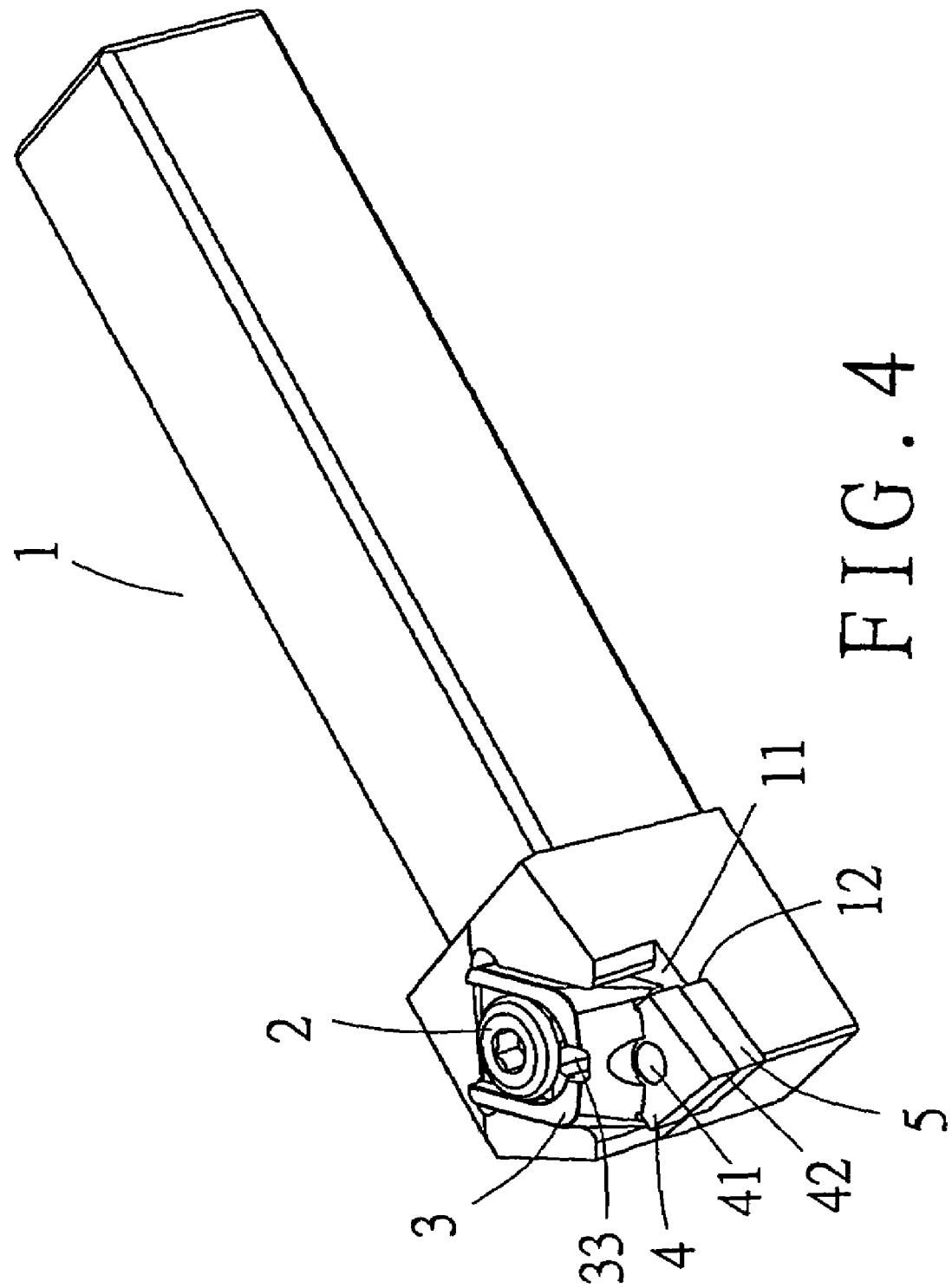
FIG. 4 is a perspective view of the present invention.
Figure 5:
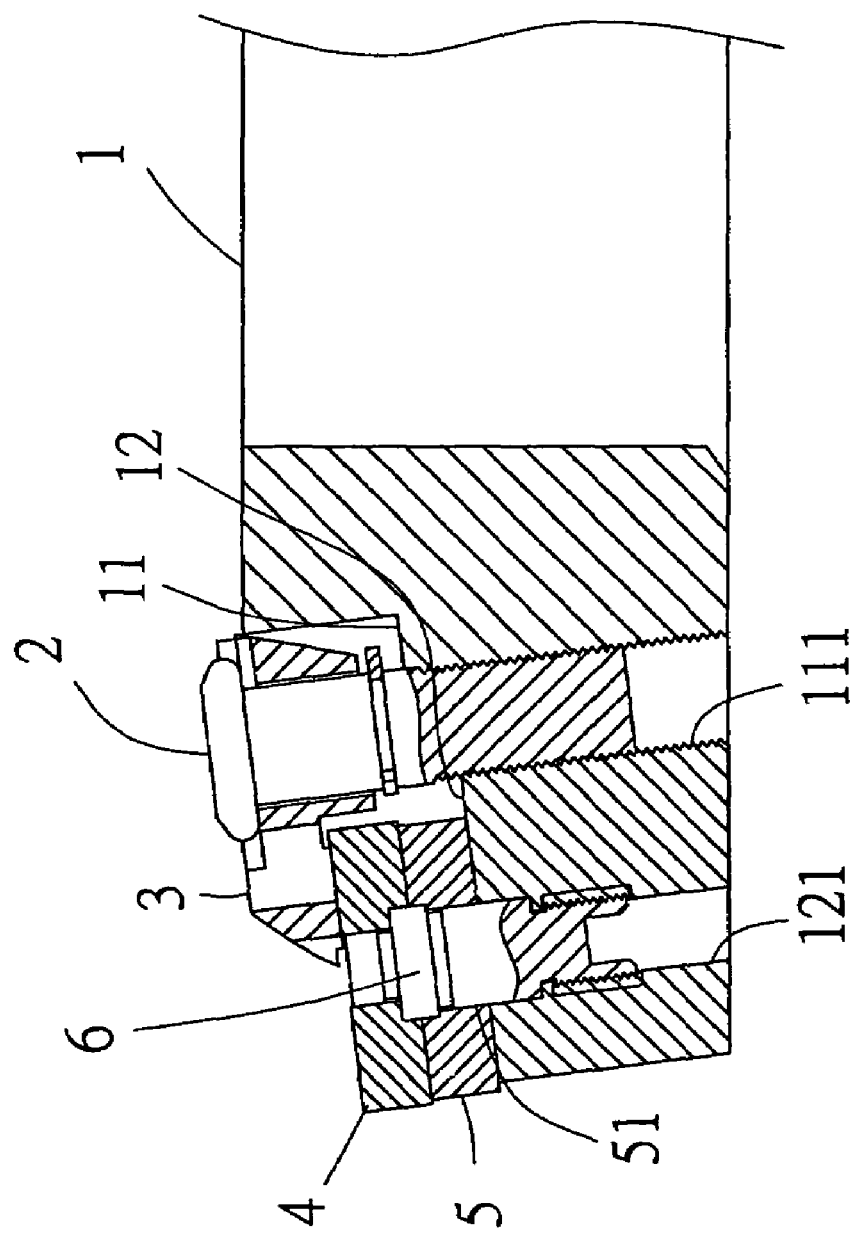
FIG. 5 is a sectional view of the present invention.
Figure 8:
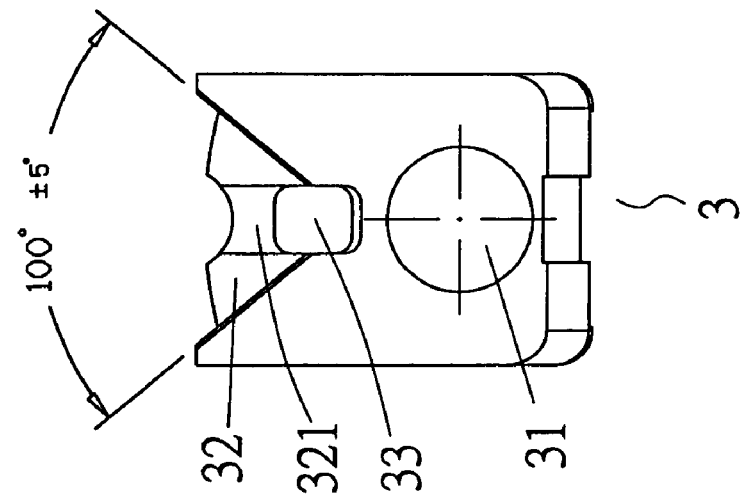
FIG. 8 is a bottom view of the third preferred embodiment of an angular pressing member.
Figure 7:
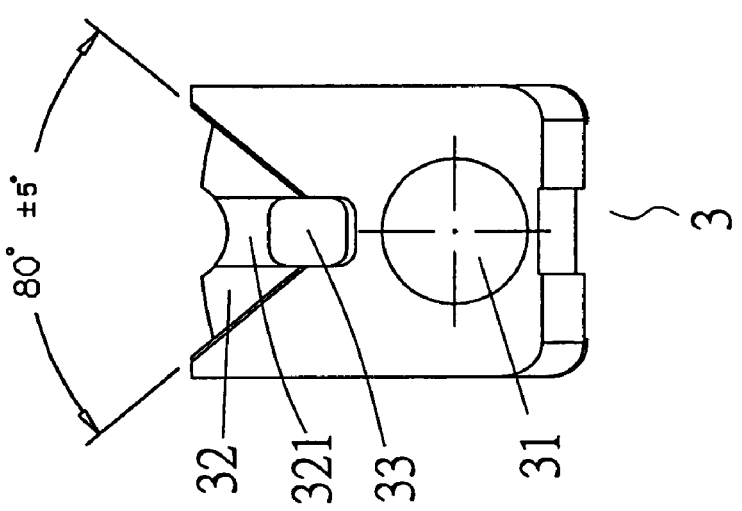
FIG. 7 is a bottom view of the second preferred embodiment of an angular pressing member.
Figure 6:
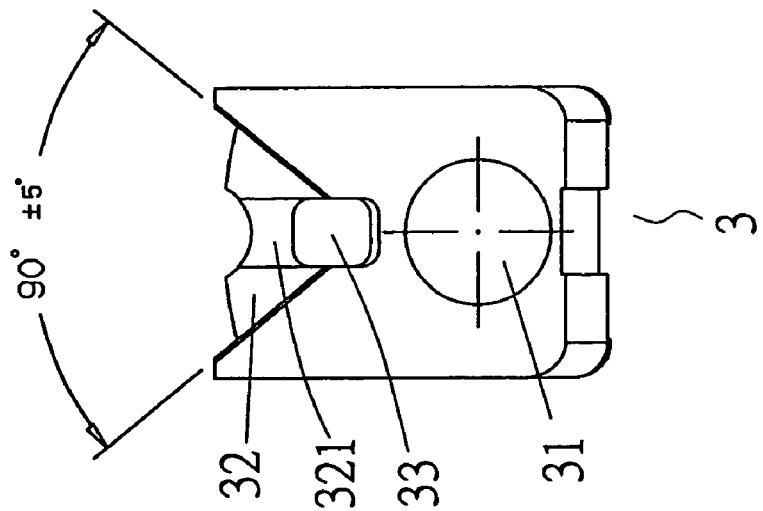
FIG. 6 is a bottom view of the first preferred embodiment of an angular pressing member.

Referring to FIGS. 1 to 3, a preferred embodiment of a tool holder consists of a tool holder main part 1, a first threaded fixing element 2, an angular pressing member 3, a plate-shaped tool 4, a pad 5, and a second threaded fixing element 6.

The main part 1 of the tool holder has a fitting portion 11 at one end, a screw hole 111 on a bottom of the fitting portion 11, and a tool holding portion 12, which is provided adjacent to a front edge of the fitting portion 11, and lower than the fitting portion 11; thus, the fitting portion 11 has a propping portion 112 adjacent to the tool holding portion 12. Furthermore, the holding portion 12 has a connecting hole 121 on a bottom thereof.

The first threaded fixing element 2 has threads 21 on a lower portion. The angular pressing member 3 has a through hole 31 on a rear portion, and a recessed holding portion 32 formed in a lower side of a front portion thereof. The recessed holding portion 32 has a hole 33 formed in an upper wall thereof at a rear end of the recessed holding portion, which is near to the through hole 31. Furthermore, the recessed holding portion 32 has a protruding portion 321 formed in the upper wall thereof and extending between a front end of the recessed holding portion and the hole 33.

The plate-shaped tool 4 has a connecting hole 41 thereon, and several tips 42 for cutting a work piece. The pad 5 has a hole 51 thereon. The second threaded fixing element 6 has threads 61 on a lower portion.

In assembly, referring to FIGS. 1 to 5, the second threaded fixing element 6 is passed though the connecting hole 41 of the plate-shaped tool 4 and into the connecting hole 121 of the tool holding portion 12 from a lower end, and passed through the connecting hole 41 of the plate-shaped tool 4 from an upper end so as to fix the plate-shaped tool 4 and the pad 5 on the tool holding portion 12. Thus, the plate-shaped tool 4 is close to the propping portion 112 of the fitting portion 11 at its edge. Next, the angular pressing member 3 is positioned on the fitting portion 11 of the main part 1 such that the recessed holding portion 32 fits over a rear portion of the plate-shaped tool 4, and the protruding portion 321 is thereby pressed against an upper side of the plate-shaped tool 4. An edge of the plate-shaped tool 4 is in close proximity with a corresponding side edge of the recessed holding portion 32, and a rear one of the tips 42 of the plate-shaped tool 4 is disposed under the hole 33 in the upper wall of the recessed holding portion 32 of the angular pressing member 3, providing clearance between the rear tip 42 and the upper wall of the recessed holding portion 32 of the angular pressing member 3. And, the first threaded fixing element 2 is passed though hole 31 and into the screw hole 111 to fix the angular pressing member 3 on the main part 1.

Because the upper side of the plate-shaped tool 4 is only in touch with the protruding portion 321 of the recessed holding portion 32 of the angular pressing member 3, the plate-shaped tool 4 won't hit the front edge of the recessed holding portion 32 with the front portion of its upper side when it is vibrating during a machining process. Consequently, the plate-shaped tool 4 is prevented from becoming damaged and broken. Furthermore, because the edge of the plate-shaped tool 4 is in close proximity to the side edge of the recessed holding portion 32, and the rear tip 42 of the plate-shaped tool 4 is located under the hole 33 formed in the upper wall of the recessed holding portion 32 of the angular pressing member 3, instead of being in contact with the angular pressing member 3, the recessed holding portion 32 of the angular pressing member 3 is able to receive and cover a larger portion of the plate-shaped tool 4. By that arrangement, the angular pressing member 3 can cover up to one-third of the area of the upper side of the plate-shaped tool 4. Consequently, the plate-shaped tool 4 is more firmly held in position, and less likely to break.

During a machining process, the rear tip 42 of the plate-shaped tool 4 won't hit the angular pressing member 3 to get damaged and broken in vibration because it is received in the hole 33 instead of touching the angular pressing member 3. In addition, when a front tip 42 of the plate-shaped tool 4 becomes blunt or breaks, the user is allowed to reposition the plate-shaped tool 4 for the rear tip 42 to face forwards for machining work pieces.

Referring to FIGS. 3 and 6 to 8, the angular pressing member 3 can have a recessed holding portion 32 forming an angle, e.g. 90±5 degrees, 80±5 degrees, and 100±5 degrees, to be suitable for a plate-shaped tool 4 in a certain shape, e.g. lozenge, peach shape, square, and parallelogram.

From the above description, it can be seen that the present invention has the following advantages:

1. During a machining process, the plate-shaped tool won't hit the front edge of the recessed holding portion from the front edge of its upper side in vibration, and is thus prevented from getting damaged and broken, because the upper side of the plate-shaped tool is only in touch with the protruding portion of the recessed holding portion of the angular pressing member.

2. The recessed holding portion of the angular pressing member is allowed to receive and cover a larger portion of the plate-shaped tool because the rear tip of the plate-shaped tool is received in the hole of the angular pressing instead of being in touch with the angular pressing member; more specifically, the angular pressing member can cover up to one-third of the area of the upper side of the plate-shaped tool. Consequently, the plate-shaped tool is more firmly held in position, and less likely to break.

3. During a machining process, the rear tip of the plate-shaped tool won't hit the angular pressing member to get damaged and broken in vibration because it is received in the hole instead of touching the angular pressing member. Therefore, the user is allowed to reposition the plate-shaped tool for the rear tip to face forwards to machine a work piece when a front tip of the plate-shaped tool becomes blunt or breaks, saving money spent on plate-shaped tools.

What is claimed is:

1. An improvement on a tool holder structure, comprising:
a tool holder main part, the tool holder main part having a fitting portion at one end; the tool holder main part having a screw hole on a bottom of the fitting portion; the tool holder main part having a tool holding portion; the tool holding portion being adjacent to a front edge of the fitting portion and lower than the fitting portion so that the fitting portion has a propping portion adjacent to the tool holding portion; the tool holding portion having a connecting hole on a bottom thereof;
an angular pressing member having a through hole on a rear portion thereof, and a recessed holding portion formed in a lower side of a front portion of the annular pressing member; the recessed holding portion having a clearance hole formed in an upper wall thereof adjacent a rear end thereof, the rear end of the recessed holding portion being proximate to the through hole of the angular pressing member; the angular pressing member further having a protruding portion formed in the upper wall of the recessed holding portion and extending between a front end thereof and the clearance hole;
a tool, the tool having a connecting hole formed therethrough; the tool having a plurality of tips for machining work pieces; and
a pad, the pad having a hole formed therethrough; the pad being positioned on and fixed to the tool holding portion of the tool holder main part by means of a threaded fixing element, which has threads on a lower portion, and which is passed through the hole of the pad and the connecting hole of the tool holding portion; the tool being positioned on the pad and fixed to the tool holding portion with said threaded fixing element being passed through the connecting hole of the tool;
the tool being close to the propping portion of the fitting portion of the tool holder main part at an edge thereof;
the angular pressing member being secured on the fitting portion of the tool holder main part such that the recessed holding portion fits over a rear portion of the tool with the protruding portion being pressed against an upper side of the tool, and an edge of the tool being in close proximity to a side edge of the recessed holding portion, and a rear one of the tips of the tool being disposed under the clearance hole of the recessed holding portion of the angular pressing member; the angular pressing member being secured to the fitting portion of the tool holder main part by means of a threaded fixing element passed through the through hole thereof and threadedly engaged with the screw hole of the tool holder main part.

2. The tool holder structure as recited in claim 1, wherein side walls of the recessed holding portion of the angular pressing member form an angle of 80±5 degrees therebetween.

3. The tool holder structure as recited in claim 1, wherein side walls of the recessed holding portion of the angular pressing member form an angle of 90±5 degrees therebetween.

4. The tool holder structure as recited in claim 1, wherein side walls of the recessed holding portion of the angular pressing member form an angle of 100±5 degrees therebetween.

* * * * *